United States Patent
Sarker et al.

(10) Patent No.: US 10,382,495 B2
(45) Date of Patent: Aug. 13, 2019

(54) METHOD AND INTERWORKING NETWORK NODE FOR ENABLING BIT RATE ADAPTION IN MEDIA STREAMING

(71) Applicant: Telefonaktiebolaget LM Ericsson (publ), Stockholm (SE)

(72) Inventors: Zaheduzzaman Sarker, Luleå (SE); Tomas Frankkila, Luleå (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/759,693

(22) PCT Filed: Sep. 25, 2015

(86) PCT No.: PCT/SE2015/051009
§ 371 (c)(1),
(2) Date: Mar. 13, 2018

(87) PCT Pub. No.: WO2017/052436
PCT Pub. Date: Mar. 30, 2017

(65) Prior Publication Data
US 2018/0309688 A1    Oct. 25, 2018

(51) Int. Cl.
*H04L 29/06*    (2006.01)
*H04N 21/00*    (2011.01)
(Continued)

(52) U.S. Cl.
CPC ........ *H04L 65/1033* (2013.01); *H04L 47/263* (2013.01); *H04L 65/1003* (2013.01);
(Continued)

(58) Field of Classification Search
CPC ... H04L 47/263; H04L 65/10; H04L 65/1003; H04L 65/1023; H04L 65/1033; H04L 69/08; H04W 28/02; H04N 21/64769
See application file for complete search history.

(56) References Cited

U.S. PATENT DOCUMENTS

| 8,416,690 B2 | 4/2013 | Zhao et al. |
| 2012/0087244 A1 | 4/2012 | Leung |

FOREIGN PATENT DOCUMENTS

| EP | 2264959 A1 | 12/2010 |
| WO | 2011018368 A1 | 2/2011 |
| WO | 2014200397 A1 | 12/2014 |

OTHER PUBLICATIONS

Johansson, I. et al., "Self-Clocked Rate Adaptation for Multimedia", RMCAT WG Internet-Draft, Jul. 6, 2015, pp. 1-32.
(Continued)

*Primary Examiner* — Kevin C. Harper
(74) *Attorney, Agent, or Firm* — Coats & Bennett, PLLC

(57) ABSTRACT

A network node and a method therein for transferring a media stream are disclosed. The network node (110) transfers (A010) a media stream from a first device (111) to at least a second device (112), wherein the first device (111) supports bit rate adaptation based on Temporary Maximum Media Stream Bitrate Request, "TMMBR", feedback and the second device (112) supports bit rate adaptation based on Self-Clocked Rate Adaptation for Multimedia, "SCReAM", feedback. The network node (110) receives (A020) SCReAM feedback from the second device (112). Furthermore, the network node (110) derives (A030) at least one rate control message from the SCReAM feedback. Moreover, the network node (110) determines (A040), based on said at least one rate control message, a recommended bit rate to be recommended for use by the first device (111) when encoding the media stream. Then, the network node (110) sends (A050) a TMMBR message to the first device (111), wherein the TMMBR message indicates the recommended bit rate. A corresponding computer program and a carrier therefor are also disclosed.

11 Claims, 2 Drawing Sheets

(51) Int. Cl.
  *H04W 28/02* (2009.01)
  *H04L 12/825* (2013.01)
  *H04N 21/238* (2011.01)
  *H04N 21/242* (2011.01)
  *H04N 21/647* (2011.01)

(52) U.S. Cl.
  CPC ....... *H04L 69/08* (2013.01); *H04N 21/64769* (2013.01); *H04W 28/02* (2013.01); *H04L 47/26* (2013.01); *H04L 65/00* (2013.01); *H04L 65/1016* (2013.01); *H04L 65/1023* (2013.01); *H04L 65/608* (2013.01); *H04N 21/00* (2013.01); *H04N 21/23805* (2013.01); *H04N 21/242* (2013.01)

(56) References Cited

OTHER PUBLICATIONS

Singh, V. et al., "Rate Adaptation for Conversational 3G Video", 2009 INFOCOM Workshops, Apr. 19-25, 2009, pp. 1-7, Rio de Janeiro, Brazil.
Johansson, I., "Self-clocked Rate Adaptation for Conversational Video in LTE", Proceedings of the 2014 ACM SIGCOMM workshop on Capacity sharing workshop, Aug. 18, 2014, pp. 51-56, Chicago, US.
3rd Generation Partnership Project, "Technical Specification Group Services and System Aspects; IP Multimedia Subsystem (IMS); Multimedia Telephony; Media handling and interaction (Release 13)", 3GPP TS 26.114 V13.0.0, Jun. 2015, pp. 1-316.

METHOD AND INTERWORKING NETWORK NODE FOR ENABLING BIT RATE ADAPTION IN MEDIA STREAMING

TECHNICAL FIELD

Embodiments herein relate to communication systems, such as media delivery systems. In particular, a network node and a method therein for transferring a media stream are disclosed. A corresponding computer program and a carrier therefor are also disclosed.

BACKGROUND

Many communication systems transfer a media stream, such as a video, audio, etc., over wired and/or wireless links. For various reasons, such as load, transmission conditions and the like, a capacity of the links varies over times. The capacity is often indicated in terms of available bandwidth. Consider a link that has an available bandwidth of X kilobits per second (kbps). Then, a media stream, coded with a bit rate of X kbps or less, can be successfully transferred on the link. In this example, the available bandwidth is considered to denote bandwidth that is actually available for a media stream, in other cases overhead may need to be considered. The media stream is usually divided into frames, which are then encoded in a media sender, transmitted over the link and decoded in a media receiver. When transmitting real-time media over Internet Protocol (IP) networks the encoded frames are typically encapsulated into Real-time Transport Protocol (RTP) packets, which are then further packetized into User Datagram Protocol (UDP) packets and then into IP packets. The media stream is typically said to be successfully transferred when requirements concerning delay, frame loss and throughput are met. The link may connect a media sender, such as a Personal Computer (PC), tablet, mobile phone, to a media receiver, such as another tablet Personal Computer (PC), or the like. However, should the available bandwidth decrease, either temporarily or permanently, it would no longer be possible to successfully transfer the media stream. In order to compensate for the variation of available bandwidth, a concept of rate adaptation has been proposed. With rate adaptation, the bit rate of the media stream is thus adapted to the currently available bandwidth. The rate adaptation can be receiver-based or sender-based as will be explained in the following.

Receiver-Based Rate Adaptation

Receiver-based rate adaptation means that a decision on how to adapt the bit rate is taken by the media receiver. Generally, the receiver-based adaptation comprises the following steps:
1 The media receiver evaluates performance of a received media stream. For example packet loss, delay, jitter and/or estimated throughput are evaluated.
2 The media receiver determines the bitrate that should be suitable for the current operating conditions, e.g. the currently available bandwidth.
3 An adaptation request is signalled back to the media sender requesting a higher or lower bitrate as appropriate in view of the currently available bandwidth.
4 The media sender usually adapts to the received bitrate, but the media sender may choose to adapt in a slightly different way, if it has reasons to do so. For example, the media sender may use a lower bitrate than what was requested or the media sender may delay switching to a higher bitrate. In general, though, the media sender applies the requested bitrate.

A known receiver-based rate adaptation procedure is described in Technical Specification (TS) 26.114 of Third Generation Partnership Project (3GPP). The receiver-based rate adaptation is defined for Multimedia Telephony Service (MTS) for Internet Protocol Multimedia Subsystem (IMS), often abbreviated MTSI. The receiver evaluates the performance, as in step 1 above. Then, the receiver sends a rate request, such as a Temporary Maximum Media stream Bit rate Request (TMMBR), back to the sender using Real-time Transport Control Protocol (RTCP). RTCP transmission rules, see below, impact when the adaptation requests can be sent.

Sender-Based Rate Adaptation

Sender-based rate adaptation means that the decision on how to adapt the bit rate is taken by the media sender. Generally, the sender-based adaptation comprises the following steps:
1 The media receiver collects metrics about performance of the received media stream. The metrics may concern for example: packet losses, delay or jitter.
2 The media receiver sends the metrics back to the media sender, typically using RTCP. The metrics are typically encapsulated in so called RTCP Receiver Reports.
3 The media sender determines the bitrate that should be suitable for the current operating conditions, such as the currently available bandwidth. The media sender may take other information into account when determining the bitrate, for example if it is sending multiple streams and if it then is better to divide the available bitrate in a different way than what is suggested by the performance metrics.
4 The media sender adapts the bit rate of the media stream to the determined bit rate.

A known sender-based rate adaptation procedure is described in Internet-Draft Self-clocked Rate Adaptation for Multimedia (SCReAM) of Jul. 6, 2015, to I. Johansson and Z. Sarker as within the Internet Engineering Task Force (IETF) RTP Media Congestion Avoidance Techniques (RM-CAT) working group, where RTP is short for Real-time Transport Protocol.

The feedback signalling, i.e. the metrics above, in SCReAM includes the following information:
- Highest received RTP sequence number: The highest received RTP sequence number for a given Synchronization Source (SSRC), such as the media stream.
- n_lost: Accumulated number of lost RTP packets for the SSRC
- Timestamp: A timestamp value indicating when the last packet was received which makes it possible to compute the one-way (extra) delay (OWD).
- n_ECN: Accumulated number of Explicit Congestion Notification-Congestion Experienced (ECN-CE) marked RTP packets for the given SSRC
- Source quench bit (Q): Makes it possible to request the sender to reduce its congestion window. This is useful if so called Real-time Communication on the Web (WebRTC) media is received from multiple hosts and it becomes necessary to balance the bit rates between the streams from the multiple hosts.

With SCReAM, relatively frequent feedback messages, say 20~30 RTCP packets per second, should be sent. Therefore, SCReAM uses Reduced-Size RTCP in order to provide the relatively frequent feedback, while still consuming a relatively low bandwidth of RTCP.

RTCP Transmission Rules

The RTCP transmission rules limit not only how frequently RTCP packets can be sent but also when each individual RTCP packet can be transmitted.

The RTCP transmission rules for the Audio Video Profile (AVP) profile are defined in Request For Comments 3550 (RFC3550), "RTP: A Transport Protocol for Real-Time Applications" from IETF. A simplified description is that, after sending an RTCP packet, the RTCP protocol function determines the interval it has to wait until it will send the next RTCP packet. This interval depends on: the allocated RTCP bandwidth; the number of end-points in the session; and the portion of active and non-active end-points. Since the RTCP packets can have varying size, the RTCP protocol function also monitors how much of the RTCP bandwidth that has been used recently. The RTCP protocol function then adds a +/−50% uniform randomization to the calculated transmission interval. The transmission interval will therefore not be constant but will vary over time.

When TMMBR is sent with Extended Audio Video Profile, also known as AVPF, feedback messages, which uses the modified RTCP transmission rules defined in IETF RFC4585, "Extended RTP Profile for Real-time Transport Control Protocol (RTCP)-Based Feedback (RTP/AVPF)". The Audio Video Profile with Feedback (AVPF) profile has three modes:

1. Regular RTCP mode, which is used when there is no need to send any urgent feedback messages. In this mode, the normal RTCP transmission rules defined in the above mentioned RFC3550 are used.
2. Immediate Feedback mode.
3. Early RTCP mode.

The Immediate Feedback mode and the Early RTCP mode are described in detail in RFC4585. However, both these modes allow for sending RTCP packet(s) without waiting the normal RTCP transmission interval according to RFC3550. This is used for sending an urgent feedback message with no or short delay, for example to send an adaptation request, e.g. TMMBR. This shortens the adaptation loop and gives faster adaptation to varying operating conditions.

In some scenarios, the sender and the receiver supports different rate adaptation procedures. Then, in order to provide interworking between the sender and the receiver, a media gateway, located somewhere between the sender and the receiver, may need to transcode the media stream to obtain matching rate adaptation procedures for the sender and the receiver. Such transcoding is costly, e.g. in terms of processing time, delay and processing resources. Therefore, so called Transcoding Free Operation (TrFO) of the media gateway is preferred.

In 3GPP, it has been discussed how to achieve TrFO for interworking between WebRTC and MTSI. The discussions have aimed at solving control plane issues.

In an exemplifying scenario, a media sender is a MTSI client, which uses TMMBR as rate adaptation, and a media receiver is a RMCAT client, which uses SCReAM as rate adaptation. Thus, different rate adaptation procedures are used in the media sender and the media receiver. Then, in order to avoid transcoding the media sender and the media receiver need to fall back to another rate adaptation procedure that both support. For example, the media sender and the media receiver can use RTCP Sender Reports (SR) and a RTCP Receiver Reports (RR) to obtain interworking in a user plane between the media sender and the media receiver. A problem with this solution is though that RTCP SR/RR is quite coarse, which would not yield a sufficiently good rate adaptation.

SUMMARY

An object may be to enable interworking between two media clients supporting a respective one of SCReAM feedback and TMMBR message.

According to an aspect, the object is achieved by a method performed by a network node, such as a Media Gateway. The network node transfers a media stream from a first device to at least a second device, wherein the first device supports bit rate adaptation based on a TMMBR message and the second device supports bit rate adaptation based on SCReAM feedback. The network node receives SCReAM feedback from the second device. Then, the network node derives at least one rate control message from the SCReAM feedback. The network node determines, based on said at least one rate control message, a recommended bit rate to be recommended for use by the first device when encoding the media stream. Furthermore, the network node sends the TMMBR message to the first device, wherein the TMMBR message indicates the recommended bit rate.

According to another aspect, the object is achieved by a network node configured for transferring a media stream from a first device to at least a second device, wherein the first device supports bit rate adaptation based on a TMMBR message and the second device supports bit rate adaptation based on SCReAM feedback. The network node is configured for receiving SCReAM feedback from the second device. Moreover, the network node is configured for deriving at least one rate control message from the SCReAM feedback. The network node is configured for determining, based on said at least one rate control message, a recommended bit rate to be recommended for use by the first device when encoding the media stream. Furthermore, the network node is configured for sending the TMMBR message to the first device, wherein the TMMBR message indicates the recommended bit rate.

According to further aspects, the object is achieved by computer programs and carriers therefor corresponding to the aspects above.

The network node derives at least one rate control message from the SCReAM feedback. The rate control message may be a so called RateCtrl message known from SCReAM terminology. Additionally, the network node determines, based on said at least one rate control message, the recommended bit rate. In this manner, the network node provides an interworking function that translates the adaptation signalling that is sent from the second device to the first device into the TMMBR message. The adaptation signalling may be the SCReAM feedback. The first device may be an MTSI client and the second device may be an RMCAT compliant client.

When the adaptation signalling is sent from the RMCAT compliant client that uses SCReAM, it is possible to convert this to rate control message(s) at the network node, such as a media gateway.

As a result, the embodiments herein provide an interworking function that converts the SCReAM feedback into the TMMBR message.

However, in some scenarios, it is expected that the rate control message cannot be sent directly to the MTSI client because the MTSI session likely don't allow for sending adaptation signalling as frequently as the SCReAM session. This means that rate control messages may according to some embodiments need to be aggregated over some time, and possibly also modified, before the TMMBR message is sent to the MTSI client.

An advantage is that quality of the media stream is maintained compared to when transcoding is used to provide interworking.

The end-to-end delay is reduced, compared to when transcoding is used. This is beneficial for maintaining a good sense of interactivity.

Complex transcoding functions in the network node are avoided, which reduces the requirements on e.g. computing resources and memory of the network node.

Unnecessary bandwidth utilization may be avoided, which makes capacity available for other devices.

In some embodiments, an advantage is that the SCReAM feedback is converted into the TMMBR message while difference in reporting frequency between SCReAM and TMMBR is accounted for by means of aggregation of rate control messages.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
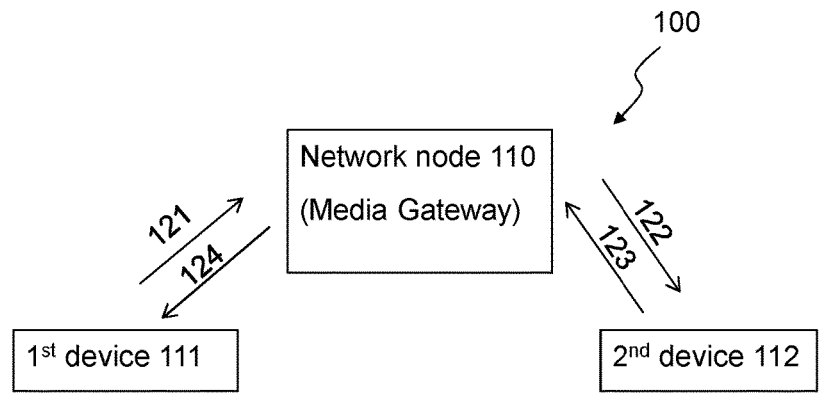
FIG. 1 is a schematic overview of an exemplifying system in which embodiments herein may be implemented.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1 depicts an exemplifying system 100 in which embodiments herein may be implemented. In this example, the network 100 is a computer system for delivering media between nodes of the computer system 100.

The computer system may comprise one or more of any wired, cellular or wireless communication system, such as a Long Term Evolution (LTE), Universal Mobile Telecommunication System (UMTS), Global System for Mobile communication (GSM), WiFi of the Institute of Electrical and Electronics Engineers (IEEE) 802.11x-standard suits and Worldwide Interoperability for Microwave Access (WiMAX).

The system 100 comprises a network node 110. The network node 110 may handle messages relating to control of media stream, such as commands for rate adaptation. The network node 110 may be a Media Gateway (MGW), Application Server (AS), Inter-Working Function (IWF), a converting node, or the like. It shall be noted that MGW is thus used as a common name for several types of gateways that provide interworking according to the embodiments herein.

Furthermore, a first device 111 and a second device 112 are shown in FIG. 1. The first device 111 uses TMMBR, but not SCReAM, as rate adaptation and the second device 112 uses SCReAM, but not TMMBR, as rate adaptation. The first device 111 may a MTSI compliant client. The second device 112 may be an RMCAT compliant client.

The network node 110 may forward 121, 122, 123, 124 information to/from the first device 111 from/to the second device 112. As an example, the network node 110 may transfer a media stream from the first device 111 to the second device 112. The Media stream may be sent in a forward direction and adaptation signalling is sent in a reverse direction. The description below focuses on when the media stream is sent from the first device 111 to the second device 112.

The forwarding 121, 122, 123, 124 may be performed over various known protocols, such as RTP, RTCP etc. In more detail in line with the scenario described in FIG. 2, payload packets of a media stream is sent 121, 122 with RTP and feedback information relating to a media stream is sent 123, 124 with RTCP.

As used herein, the term "device" may refer to a user equipment, a machine-to-machine (M2M) device, a mobile phone, a cellular phone, a Personal Digital Assistant (PDA) equipped with radio communication capabilities, a smartphone, a laptop or personal computer (PC), a tablet PC, a portable electronic radio communication device or the like. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

As an overview, in order to better appreciate the detailed description below, the method according to embodiments herein includes one or more of the following actions.

Firstly, e.g. as in action A020 below, the network node 110 receives SCReAM feedback.

Moreover, e.g. as in action A030, the network node 110 derives, or generates, at least one rate control message. Before, this generation of the rate control message(s), the network node 110 may store and aggregate a plurality of SCReAM feedbacks, or SCReAM feedback messages.

Furthermore, e.g. as in action A040, the network node 110, determines, or generates, at least one TMMBR message based the rate control message(s). Since the TMMBR message includes a recommended bit rate, this action may be expressed as generating, or determining, the recommended bit rate. Before, this generation of the TMMBR message(s), the network node 110 may store and aggregate a plurality of rate control messages.

Additionally, e.g. as in action A050, the network node 110 sends the TMMBR message to the first device 111. Before, this sending of the TMMBR message(s), the network node 110 may store and aggregate a plurality of TMMBR messages.

Hence, aggregation may be performed at, at least, three different occasions.

Figure 2:
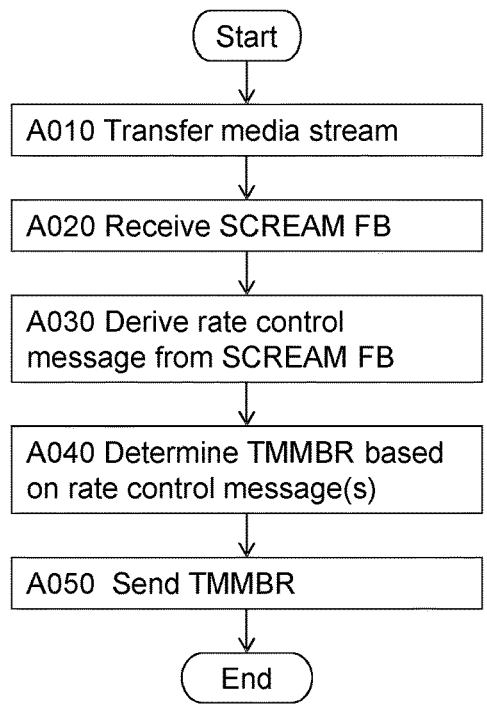
FIG. 2 is a flowchart illustrating embodiments of the method in the network node.

FIG. 2 illustrates an exemplifying method according to embodiments herein when implemented in the network 100 of FIG. 1. With this method the network node 110 translates SCReAM feedback, from the second device 112, into TMMBR to be sent to the first device 111.

One or more of the following actions may be performed in any suitable order.

Action A010

The network node 110 transfers a media stream from a first device 111 to at least a second device 112. As an example, the network node 110 is an intermedia node between the first device 111 and the second device 112, which forwards media data of the media stream towards said at least second device 112. That is to say, the network node receives packets of the media stream from the first device 111 and sends those packets towards said at least second device 112.

As indicated above, the first device 111 supports bit rate adaptation based on a TMMBR message, i.e. the first device 111 may be MTSI compliant. The second device 112 supports bit rate adaptation based on SCReAM feedback, i.e. the second device 112 may be RMCAT compliant.

Action A020

The network node 110 receives SCReAM feedback from the second device 112. This means that the network node 110 may receive one or more pieces of SCReAM feedback at one or more occasions.

In some examples, as will be elaborated below, the SCReAM feedback may be received within a time interval, or a time window. A duration of the time interval may be dependent on bandwidth between the network node 110 and the first device 111.

The network node 110 may now send the media stream, e.g. packets thereof, according to the SCReAM feedback.

Action A030

The network node 110 derives, e.g. periodically, at least one rate control message, such as a RateCtrl message, from the SCReAM feedback. The network node 110 may further derive said at least one rate control message based on a length of a RTP packet queue. RTP packets, produced by the first device 111 are inserted into the a RTP packet queue, such as a First-In-First-Out (FIFO) queue.

The rate control message indicates a bit rate that the first device is recommended to use. This bitrate does not include Internet Protocol/User Datagram Protocol/Real-time Transport Protocol (IP/UDP/RTP) overhead.

In addition to, or as an alternative to, the time window, it may be required to aggregate several SCReAM feedbacks into one TMMBR message. Hence, said at least one rate control message may comprise at least two rate control messages. When several SCReAM feedbacks are to be aggregated, the network node 110 may first store the SCReAM feedbacks in a buffer. Hence, the network node 110 may later retrieve the buffered SCReAM feedbacks when performing aggregation as is explained further below.

As an example, the network node 110 may derive, or generate, rate control messages, at a rate of e.g. 30 times per second. The rate control message(s) may be pushed to a queue in a local memory of the network node 110.

Action A040

The network node 110 determines, based on said at least one rate control message, a recommended bit rate to be recommended for use by the first device 111 when encoding the media stream.

A TMMBR message is used to carry the recommended bit rate in action A050. Thus, the TMMBR message indicates the recommended bit rate. This means that this action may be said to include generation of the TMMBR message.

The TMMBR messages are defined in IETF RFC 5104, "Codec Control Messages in the RTP Audio-Visual Profile with Feedback (AVPF)". The bitrate signalled in the TMMBR message does include the IP/UDP/RTP overhead. The TMMBR message also comprises information about the measured overhead. This also needs to be handled when generating the TMMBR message, e.g. via the recommended bit rate.

In action A040, the network node 110 may thus generate, or determine, the TMMBR message by:
    generating a TMMBR message based on a single rate control message, or
    generating a TMMBR message by aggregating several rate control messages.

Generate a TMMBR Message Based on a Single Rate Control Message

In this case, a TMMBR message is generated based on a single rate control message, i.e. without aggregating several rate control messages. Hence TMMBR messages will be generated at the same rate of rate control message arrival rate. However, due to bandwidth limitation and RTCP packet sending rules, it might not be possible to send the generated TMMBR messages as frequent as the rate control message arrival rate.

In such a scenario, the TMMBR messages need to be stored in a buffer. An attempt to sending the TMMBR message will be done on arrival of one new rate control message and if the TMMBR message is allowed to be sent at that time then a new TMMBR value will be calculated from the TMMBR messages in the buffer. The length of the buffer may grow until the next TMMBR message is sent. When a TMMBR is send then the buffer will be flashed to remove all the TMMBR messages.

If there are several TMMBR messages in the buffer then one possibility is to send all of them when it is time to send the RTCP packet. This will however give large RTCP packets, which consume a large portion of the RTCP bandwidth and increases the RTCP transmission interval.

Another way is to aggregate the buffered TMMBR messages in a similar way as rate control messages are aggregated and send only a single TMMBR message. This is further described in the second embodiment below.

After calculation of the new TMMBR rate from the buffered ones, this value further need to be compared with a previously successfully transmitted TMMBR rate, which is the previously requested bitrate. If the new TMMBR rate deviates from the previously requested bitrate by more than a certain margin, e.g. 3%, then the new TMMBR message is sent in action A050 below.

This margin is used to avoid sending unnecessary TMMBR messages and save the RTCP bandwidth or transmission time for more useful use.

Generate TMMBR Message by Aggregating Rate Control Messages

If Early RTCP mode has been used to send an urgent TMMBR message, then it is not possible to send the next TMMBR message until a regular RTCP report is sent. In this case, the process of generating TMMBR message also has the following information:
    TIME_RTCP_NEXT, the time for next regular RTCP report to be send
    TIME_TMMBR_SENT, the time when last TMMBR was sent Based on this information, it is possible to calculate the time during which the sending of TMMBR message is not allowed. During the non_allowed period of TMMBR message the rate control messages need to be buffered and when the TMMBR sending is allowed then an aggregated TMMBR value need to be calculated from the buffered rate control messages.

This is further described in the first embodiment below.

Similar to above, to reduce the number of unnecessary TMMBR that are sent, the current value of the TMMBR rate is compared with the previous successfully send TMMBR message and if the difference exceeds a certain threshold then the TMMBR message is send. Otherwise, no new TMMBR message is sent. We recommend the threshold to be 3%.

When a TMMBR message is successfully sent the buffer need to be reset.

The TMMBR messages can be sent either as an individual AVPF Feedback Messages or with a regular RTCP packet together with the Sender Report (SR)/Receiver Report (RR), as described in [5104]. The process is shown below.

It is also possible that at the sender of TMMBR message both methods of calculating/generating TMMBR rate are used together.

The media stream may typically have a current bit rate. Then, the network node 110 may further determine the recommended bit rate based on the current bit rate. As an example, when the current bit rate is relatively high, a greater difference between the recommended bit rate and the current bit rate may be allowed as compared to when the current bit rate is relatively low.

The network node 110 may determine the recommended bit rate by aggregating said at least one rate control message into an aggregated bit rate. Then, the network node 110 may further determine the recommended bit rate based on the aggregated bit rate.

Expressed differently, the determining A040 of the recommended bit rate may comprise aggregating said at least one rate control message into an aggregated bit rate. Moreover, the determining A040 of the recommended bit rate is further based on the aggregated bit rate.

When aggregation is performed, it may also be needed to modify the aggregated bit rate further. If the aggregation results in a bit rate X then, it may be wise to actually send a request for a bit rate Y, where Y<X, i.e. the recommended bit rate. If and by how much the aggregated bit rate is reduced may depend on e.g. whether the bit rate is to be reduced or increased, the length of the time interval, how much the aggregated bit rate is reduced/increased over the time interval, and/or if some trends can be determined.

In some examples, a push event may indicate to the network node 110 that a new rate control message is available.

Upon arrival of the rate control message, the network node 110 may calculate whether the bit rate is increasing or decreasing as follows, where n is a previously received rate control message:

if (Value of RateCtrl$_{n+1}$>Value of RateCtrl$_n$) then,
  rateChangeDirection=1, which means that the bit rate is increasing else if (Value of RateCtrl$_{n+1}$<Value of RateCtrl$_n$) then
  rateChangeDirection=-1, which means that the bit rate is decreasing else
  rateChangeDirection=0, which means that the bit rate is unchanged.

The rateChangeDirection, or a direction of change of bit rate, indicates to the network node 110 how the value of the rate control messages changes.

The network node 110 may then determine the recommended bit rate based on the direction of change of the bit rate, i.e. the recommended bit rate.

For example, when the bit rate is increasing, the recommended bit rate may be set more conservatively than given by the rate control message, i.e. a margin may be applied. See further details below.

Action A050

The network node 110 sends TMMBR message to the first device 111. The TMMBR message indicates the recommended bit rate.

In some examples, the sending of the TMMBR message may not be sent for every rate control message as explained above using aggregation. Hence, a frequency of the sending of the TMMBR message is adjusted as compared to a frequency of the received rate control message(s).

In the SCReAM algorithm, the ACK messages received from the second device 112 decides how much of the data that can be sent on the network. This is characteristic for the SCReAM algorithm. Where there is a miss-match between the bit rate of the media stream and a bit rate of sending of the media data, the media data, such as RTP packets, will be stored in a RTP queue. The SCReAM algorithm uses a RATE_ADJUST_INTERVAL to continuously check the RTP queue and the volume of acked bitrate in a unit time (rate-acked) to calculate the target rate for the encoder. Hence, the RATE_ADJUST_INTERVAL indicates an arrival rate of the rate control messages.

A few embodiments are described below.

In a first embodiment, the network node 110 may aggregate at least two rate control messages and then generate the TMMBR message.

In this embodiment, the network node 110 may, e.g. as part of action A030, store the derived rate control messages in a buffer of the network node 110.

Then, also e.g. as part of action A030, the network node 110 may create an aggregated rate control message from some or all of the stored rate control messages.

Furthermore, e.g. as part of action A040, the network node 110 may determine whether or not a TMMBR message should be sent. For example, if no change, or too small change, since last time a TMMBR message was sent, then no TMMBR message should be sent again.

The network node 110 may generate, e.g. as part of action A040, a TMMBR message based on the aggregated rate control message.

Moreover, the network node 110 sends as in action A050, using the RTCP protocol function, the TMMBR message when needed.

The RTCP transmission rules described in the background section means that there is a period after sending an RTCP packet, e.g. normally using regular RTCP transmission rules or urgent using the modified RTCP transmission rules, when it is known that another RTCP packet cannot be sent. During at least this period, the received rate control messages are stored. A period between RTCP packets varies over time, depending on several factors. The rate control messages can also be buffered during a longer period if there was no need for adapting the bitrate.

When the sender determines that an RTCP packet can be sent, the rate requests from the rate control messages are aggregated. This means that the aggregation is performed in the application layer. The aggregation is further discussed below.

If the aggregation shows that the rate of the encoding should be changed then a TMMBR message is generated and sent. The decision on whether the encoding rate needs to be changed is further discussed in below.

In a second embodiment, the network node 110 may generate one TMMBR message for each rate control message and then aggregate the generated TMMBR messages.

In this embodiment, the network node 110 may, e.g. as part of action A040, generate a respective TMMBR message for each derived rate control message.

Furthermore, the network node 110 may create an aggregated TMMBR messages from some or all of the TMMBR messages. Expressed differently, the network node may create an aggregated rate request based on some of all of the respective rate requests in the TMMBR messages. Then, another aggregated TMMBR message may be created, by the network node 110, wherein the other aggregated TMMBR message indicates the aggregated rate request.

Similarly to the first embodiment, the TMMBR message may for example be sent only when needed.

A difference from the first embodiment is that the aggregation is done in the RTCP protocol function, based on the rate requests in the TMMBR messages.

In the first embodiment, it is the TMMBR messages that are buffered instead of the rate control messages.

This variant is useful when the application layer does not know when the next TMMBR message can be transmitted.

In a third embodiment, the first and second embodiments may be combined. It may happen that the application does not know exactly when the RTCP protocol function will send the next RTCP packet, which may carry the TMMBR message. This means that it may happen that the application layer generates several TMMBR messages and these are then stored in a buffer of the RTCP protocol function before they may be sent.

In this case, it may be beneficial to combine the first and the second embodiments such that a first aggregation is performed in the application layer based on the buffered rate control messages and a second aggregation is performed based on the TMMBR messages, e.g. in the RTCP protocol function.

Above, it has been explained that aggregation may be useful in many aspects. A more detailed description of the aggregation will now follow with reference to aggregation of rate control messages. However, it shall be understood that similar aggregation methods may be applied for the aggregation of TMMBR messages, rate requests and/or SCReAM feedback.

The aggregation when calculating the recommended bitrate to request, if needed, may be done in several ways and/at several occasions. In the following, the aggregation is done in the application layer using the rate control messages as described in the first embodiment.

Average Aggregation

An exemplifying solution for the aggregation is to calculate the average of the bitrates derived from the buffered rate control messages:

$$r_{avg} = \text{average(RateCtrl message in the buffer)} \qquad \text{Eq. 1}$$

The average calculation may be performed either on all of the buffered rate control messages or only a subset of the buffered the rate control messages. In the latter case, the most recently received rate control messages, received over an interval, are used.

The length of the interval determines how fast the adaptation will react to changing operating conditions. A shorter time interval means that the reaction becomes faster while a longer interval means that the reaction becomes slower.

It is possible to use, for example, a short interval to get fast reaction when the bitrate needs to be reduced while a longer interval may be used to give slower reaction when the bitrate needs to be increased.

The average requested bitrate is then compared to the currently used bitrate, possibly with a margin, to determine if a new bitrate should be requested using TMMBR:

If $r_{avg}$ is lower than the currently used bitrate, possibly by a certain margin, it is decided to reduce the encoding bitrate (rateChangeDirection <0)

Otherwise, if $r_{avg}$ is higher than the currently used bitrate, possibly by a certain margin, it is decided to increase the encoding bitrate (rateChangeDirection >0)

Otherwise, it is decided to keep the currently used encoding bitrate unchanged (rateChangeDirection=0).

It is then decided which bitrate to request:

if (reteChangeDirecdtion>0) then
 newRate=$r_{avg}$*alpha$_1$ $\qquad$ Eq. 2 if (reteChangeDirecdtion<0) then
 newRate=$r_{avg}$*alpha$_2$ $\qquad$ Eq. 3

Setting the alpha$_1$ and alpha$_2$ values to a value less than 1 means that a safety margin is applied.

It should be understood that the alpha$_1$ and alpha$_2$ values may use different values or the same numbers to indicate different or same safety margins for up-switch and down-switch, respectively.

The newRate value is then sent in the TMMBR message.

Median Aggregation

An alternative to the averaging aggregation described above is to perform a median calculation instead of the average calculation but otherwise follow what is described above.

Min/Max Aggregation

Another possibility is to calculate both the minimum bitrate and the maximum bitrate over the aggregation period.

$$r_{max} = \text{max(RateCtrl message in the buffer)} \qquad \text{Eq. 4}$$

$$r_{min} = \text{min(RateCtrl message in the buffer)} \qquad \text{Eq. 5}$$

Based on these rates it is decided if the bitrate should be increased, decreased or maintained:

If $r_{min}$ is lower than the currently used bitrate, possibly by a certain margin, it is decided to reduce the encoding bitrate (rateChangeDirection <0)

Otherwise, if $r_{max}$ is higher than the currently used bitrate, possibly by a certain margin, it is decided to increase the encoding bitrate (rateChangeDirection >0)

Otherwise, it is decided to keep the currently used encoding bitrate unchanged (rateChangeDirection=0).

It is then decided what bitrate to request:

if (rateChangeDirection >0) then
 newRate=$r_{max}$*alpha$_1$ $\qquad$ Eq. 6 if (rateChangeDirection <0) then
 newRate=$r_{min}$*alpha$_2$ $\qquad$ Eq. 7

The newRate value is then sent in the TMMBR message.

Setting the alpha$_1$ and alpha$_2$ values to a value less than 1 means that a safety margin is applied.

It shall be understood that the alpha$_1$ and alpha$_2$ values may use different values or the same numbers to indicate different or same safety margins for up-switch and down-switch, respectively.

Other Variants for Aggregation

It should be noted that the above aggregation methods are only examples and that other variants are also possible.

It is also possible to combine different aggregations methods, for example:

Use one aggregation method to determine if the bitrate should be reduced.

Use another aggregation method to determine if the bitrate should be increased.

Use a third aggregation method to determine what bitrate to request.

Which aggregation method(s) that are used depends on the desired adaptation properties. For example:

The minimum calculation reacts immediately to the rate control message that gives the lowest bitrate. One may thus say that the minimum (and maximum) calculations are quite sensitive to varying operating conditions. This sensitivity may be a desired property for triggering bitrate down-switch but it may be less suitable to trigger bitrate up-switch. Using the minimum calculation for down-switch and maximum calculation for up-switch may result in a bitrate that varies a lot, which may be expected to give large quality variations.

The average calculation is a more "stable" method, which reacts slower to varying operating conditions. The variations when using the average calculation should also be smaller than for the minimum/maximum calculation. These properties make the average calculation more suitable for triggering the up-switch.

The median calculation is similar to the average calculation although a few extreme values (extremely low bitrate or extremely high bitrate) have less impact on the calculated bitrate. These properties may be useful when determining which bitrate to request.

The different aggregation methods thus have different properties, which means that a careful consideration is needed to achieve the desired adaptation properties. Usually, the desired adaptation properties are:

Fast back-off (bitrate down-switch)
Slow ramp-up (bitrate up-switch)
Stable bitrate (small bitrate variations)

Above, it has been described that a safety margin is applied by using the $alpha_1$ and $alpha_2$ values. This may also be done in several ways, for example:

One possibility is to use a safety margin that is relative to the bitrate from the aggregation, e.g. 3%.

Another possibility is to use an absolute safety margin, e.g. 100 kbps.

Yet another possibility is to use different absolute safety margins depending on the currently used bitrate, e.g.: 50 kbps safety margin if the currently used bitrate is 500 kbps or lower; 200 kbps if the currently used bitrate is between 500 and 1000 kbps; and 500 kbps if the bitrate is higher than 1000 kbps.

Other variants are also possible.

The embodiments above relate to a scenario in which the first device 111 sends the media stream to the second device 112. In an opposite scenario, the first device 111 receives the media stream from the second device 112. Then, interworking of signalling from TMMBR to SCReAM will be needed.

For this interworking, a number of solutions may be used. For example, the network node 110 may change the SCReAM feedback message to include a bit rate recommendation. For example, the SCReAM feedback message may include the bit rate recommendation, when the so called Source Quench bit (Q) is set.

Alternatively, it may be mandated that RMCAT compliant clients always support TMMBR. In this case the TMMBR generated from the IMS/MTSI/ViLTE/VoLTE client will simply be forwarded to the RMCAT compliant client.

Figure 3:
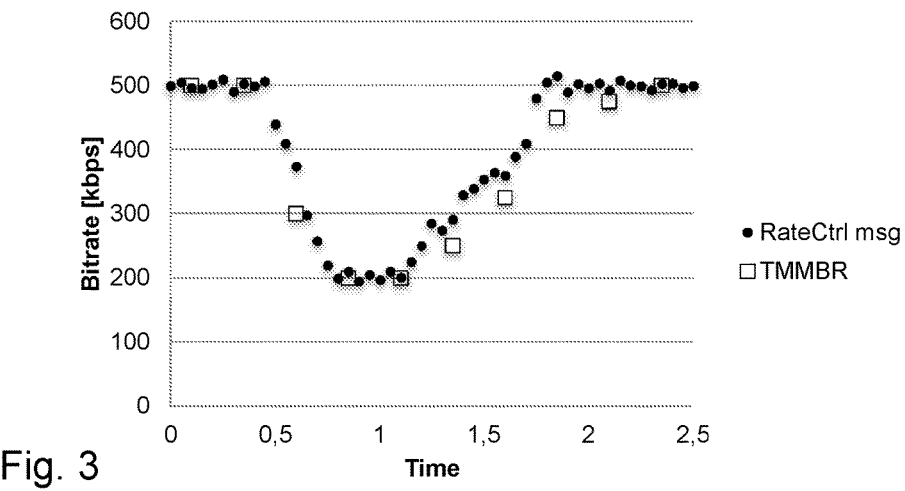
FIG. 3 is a diagram illustrating bit rate as a function of time.

FIG. 3 shows frequency of derived rate control messages and TMMBR messages as a function of time. Notably, the TMMBR messages are less frequent than the rate control messages.

Figure 4:
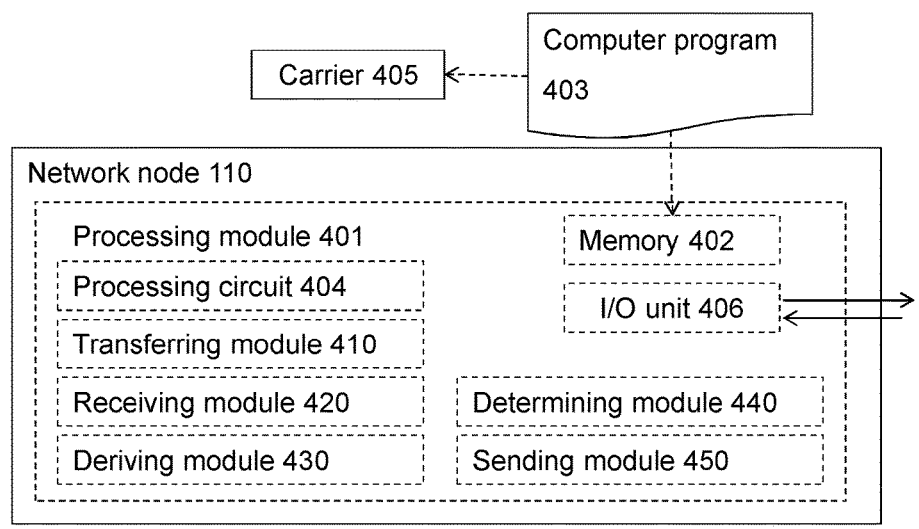
FIG. 4 is a block diagram illustrating embodiments of the network node.

With reference to FIG. 4, a schematic block diagram of embodiments of the network node of FIG. 1 is shown.

The network node may comprise a processing module 401, such as a means, one or more hardware modules and/or one or more software modules for performing the methods described herein.

The network node may further comprise a memory 402. The memory may comprise, such as contain or store, a computer program 403.

According to some embodiments herein, the processing module 401 comprises, e.g. 'is embodied in the form of' or 'realized by', a processing circuit 404 as an exemplifying hardware module. In these embodiments, the memory 402 may comprise the computer program 403, comprising computer readable code units executable by the processing circuit 404, whereby the network node is operative to perform the methods of FIG. 2.

In some other embodiments, the computer readable code units may cause the network node to perform the method according to FIG. 2 when the computer readable code units are executed by the network node.

FIG. 4 further illustrates a carrier 405, or program carrier, which comprises the computer program 403 as described directly above.

In some embodiments, the processing module 401 comprises an Input/Output unit 406, which may be exemplified by a receiving module and/or a sending module as described below when applicable.

In further embodiments, the processing module 401 may comprise one or more of a transferring module 410, a receiving module 420, a deriving module 430, a determining module 440, and a sending module 450 as exemplifying hardware modules. In other examples, one or more of the aforementioned exemplifying hardware modules may be implemented as one or more software modules.

Therefore, according to the various embodiments described above, the network node and/or the processing module 401 and/or the transferring module 410 is configured for transferring a media stream from a first device 111 to at least a second device 112, wherein the first device 111 supports bit rate adaptation based on Temporary Maximum Media Stream Bitrate Request, "TMMBR", feedback and the second device 112 supports bit rate adaptation based on Self-Clocked Rate Adaptation for Multimedia, "SCReAM", feedback.

The network node 110 and/or the processing module 401 and/or the receiving module 420 is/are configured for receiving SCReAM feedback from the second device 112.

The network node 110 and/or the processing module 401 and/or the deriving module 430 is/are configured for deriving at least one rate control message from the SCReAM feedback.

The network node 110 and/or the processing module 401 and/or the determining module 440 is/are configured for determining, based on said at least one rate control message, a recommended bit rate to be recommended for use by the first device 111 when encoding the media stream.

The network node 110 and/or the processing module 401 and/or the sending module 450 is/are configured for sending TMMBR message to the first device 111, wherein the TMMBR message indicates the recommended bit rate.

The network node 110 and/or the processing module 401 and/or the receiving module 420 may be configured for receiving the SCReAM feedback within a time interval, wherein a duration of the time interval may be dependent on bandwidth between the network node 110 and the first device 111.

The media stream may have a current bit rate, wherein the network node 110 and/or the processing module 401 and/or the determining module 440 may be configured for determining the recommended bit rate based on the current bit rate.

The network node 110 and/or the processing module 401 and/or the determining module 440 may be configured for determining the recommended bit rate by aggregating said at least one rate control message into an aggregated bit rate. Moreover, the network node 110 and/or the processing module 401 and/or the determining module 440 may be configured for determining the recommended bit rate based on the aggregated bit rate.

Said at least one rate control message may comprise at least two rate control messages.

In one exemplifying implementation, the network node 110 may comprise:

a SCReAM-IW module outputs the rate control messages, which are generated at a rate of, for example 30 times per second, and a rate control adaptation module that receives the rate control messages from the SCReAM-IW module and converts them to TMMBR messages.

If RTCP in a first session cannot be sent with the same frequency as in the SCReAM session then the rate control messages are aggregated over some time before they are converted to TMMBR messages.

The resulting aggregated value may also need to be modified before the rate request is sent with TMMBR to the first client.

The rate control adaptation module may be divided into two processes/functions as follows.

One process that receives the rate control messages, stores them, e.g. at least the requested bitrate, in local memory. Here, this process may receive the rate control message from a SCReAM function according to prior art. Next, the process determines if the bitrate of the encoding should be changed.

Another process fetches the stored rate control messages from the local memory/buffer, determines which bitrate to request and sends the TMMBR message to the sender.

Now some further background information is presented in order to draw the attention towards some scenarios in which the embodiments herein may be applicable.

"GSMA PRD IR.94, IMS Profile for Conversational Video Service" discloses that TMMBR is also used for Video telephony over LTE (ViLTE).

Moreover, IETF is discussing congestion control for real-time media in the RMCAT working group. It is then envisioned that the solution for congestion control defined in RMCAT will be used in also in WebRTC. One of the proposed solutions is the above mentioned SCReAM method.

Furthermore, interworking between MTSI/ViLTE and WebRTC is also being defined in some 3GPP working groups.

The required and recommended codec support for MTSI and WebRTC is shown in the table below.

TABLE 1

Codec support in MTSI and WebRTC

| Codec support | MTSI [MTSI] | WebRTC [WebRTC] |
|---|---|---|
| Required | H.264 [H.264] (AVC) Constrained Baseline Profile (CBP) Level 1.2 | VP8 [VP8] H.264 Constrained Baseline Profile Level 1.2. |
| Recommended | H.264 (AVC) Constrained Baseline Profile Level 3.1. H.265 (HEVC) Main Profile, Main Tier, Level 3.1. | H.264 Constrained Baseline Profile Level 1.3. |

Since both MTSI and WebRTC support H.264 Constrained Baseline Profile (CBP) with at least Level 1.2, it is possible to set up a session such that transcoding can be avoided. This however also requires that adaptation requests can be sent all the way between the end-points (encoder and decoder).

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "unit" may refer to one or more functional units, each of which may be implemented as one or more hardware modules and/or one or more software modules in a node.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, the method comprising a network node:
transferring a media stream from a first device to at least a second device, wherein the first device supports bit rate adaptation based on a Temporary Maximum Media Stream Bitrate Request (TMMBR) message and the second device supports bit rate adaptation based on Self-Clocked Rate Adaptation for Multimedia (SCReAM) feedback;
receiving SCReAM feedback from the second device;
deriving at least one rate control message from the SCReAM feedback;
determining, based on the at least one rate control message, a recommended bit rate to be recommended for use by the first device when encoding the media stream; and
sending the TMMBR message to the first device, wherein the TMMBR message indicates the recommended bit rate.

2. The method of claim 1, wherein the SCReAM feedback is received within a time interval, wherein a duration of the time interval is dependent on bandwidth between the network node and the first device.

3. The method of claim 1:
wherein the media stream has a current bit rate; and
wherein the determining of the recommended bit rate further is based on the current bit rate.

4. The method of claim 1:
wherein the determining of the recommended bit rate comprises aggregating the at least one rate control message into an aggregated bit rate; and
wherein the determining of the recommended bit rate further is based on the aggregated bit rate.

5. The method of claim 4, wherein the at least one rate control message comprises at least two rate control messages.

6. A network node, comprising:
processing circuitry;
memory containing instructions executable by the processing circuitry whereby the network node is operative to:
transfer a media stream from a first device to at least a second device, wherein the first device supports bit rate adaptation based on a Temporary Maximum Media Stream Bitrate Request (TMMBR) message and the second device supports bit rate adaptation based on Self-Clocked Rate Adaptation for Multimedia (SCReAM) feedback;
receive SCReAM feedback from the second device;
derive at least one rate control message from the SCReAM feedback;
determine, based on the at least one rate control message, a recommended bit rate to be recommended for use by the first device when encoding the media stream; and
send the TMMBR message to the first device, wherein the TMMBR message indicates the recommended bit rate.

7. The network node of claim 6, wherein the instructions are such that the network node is operative to receive the SCReAM feedback within a time interval, wherein a duration of the time interval is dependent on bandwidth between the network node and the first device.

8. The network node of claim 6:
wherein the media stream has a current bit rate; and
wherein the instructions are such that the network node is operative to determine the recommended bit rate based on the current bit rate.

9. The network node of claim 6, wherein the instructions are such that the network node is operative to:
aggregate the at least one rate control message into an aggregated bit rate; and
determine the recommended bit rate based on the aggregated bit rate.

10. The network node of claim 9, wherein the at least one rate control message comprises at least two rate control messages.

11. A non-transitory computer readable recording medium storing a computer program product for controlling a network node, the computer program product comprising software instructions which, when run on processing circuitry of the network node, causes the network node to:
transfer a media stream from a first device to at least a second device, wherein the first device supports bit rate adaptation based on a Temporary Maximum Media Stream Bitrate Request (TMMBR) message and the second device supports bit rate adaptation based on Self-Clocked Rate Adaptation for Multimedia (SCReAM) feedback;

receive SCReAM feedback from the second device;

derive at least one rate control message from the SCReAM feedback;

determine, based on the at least one rate control message, a recommended bit rate to be recommended for use by the first device when encoding the media stream; and send the TMMBR message to the first device, wherein the TMMBR message indicates the recommended bit rate.

* * * * *